United States Patent
Ryou et al.

(10) Patent No.: US 11,146,385 B2
(45) Date of Patent: Oct. 12, 2021

(54) SECURITY COMMUNICATION METHOD IN NFV ENVIRONMENT AND SYSTEM THEREOF

(71) Applicant: The Industry & Academic Cooperation in Chungnam National University, Daejeon (KR)

(72) Inventors: Jae Cheol Ryou, Daejeon (KR); Hyun Jin Kim, Daejeon (KR)

(73) Assignee: The Industry & Academic Cooperation in Chungnam National University, Daejeon (KR)

( * ) Notice: Subject to any disclaimer, the term of this patent is extended or adjusted under 35 U.S.C. 154(b) by 305 days.

(21) Appl. No.: 16/473,082

(22) PCT Filed: Nov. 29, 2018

(86) PCT No.: PCT/KR2018/014994
§ 371 (c)(1),
(2) Date: Jun. 24, 2019

(87) PCT Pub. No.: WO2019/132270
PCT Pub. Date: Jul. 4, 2019

(65) Prior Publication Data
US 2021/0028923 A1    Jan. 28, 2021

(30) Foreign Application Priority Data

Dec. 27, 2017   (KR) .......................... 10-2017-0181217

(51) Int. Cl.
*H04L 29/06*    (2006.01)
*H04L 9/06*    (2006.01)
(Continued)

(52) U.S. Cl.
CPC .......... *H04L 9/0643* (2013.01); *H04L 9/0819* (2013.01); *H04L 9/0861* (2013.01); *H04L 9/14* (2013.01); *H04L 2209/38* (2013.01)

(58) Field of Classification Search
CPC ... H04L 9/0643; H04L 9/0819; H04L 9/0861; H04L 9/14; H04L 2209/38; H04L 9/0841; H04L 9/3239; H04L 29/06
See application file for complete search history.

(56) References Cited

U.S. PATENT DOCUMENTS

| | | | |
|---|---|---|---|
| 10,348,488 B1 * | 7/2019 | Paczkowski .......... | H04L 9/3239 |
| 2010/0042841 A1 * | 2/2010 | King .................... | H04L 9/0844 713/171 |

(Continued)

FOREIGN PATENT DOCUMENTS

KR    10-1319586 B1    10/2013

OTHER PUBLICATIONS

Ian Oliver et al., "Experiences in Trusted Cloud Computing" International Conference on Network and System Security Jul. 26, 2017, Security Research Group, Nokia Bell Labs, Espoo, Finland.
(Continued)

*Primary Examiner* — John B King
(74) *Attorney, Agent, or Firm* — Novick, Kim & Lee, PLLC; Sang Ho Lee (57) ABSTRACT

Provided is a security communication method in a NFV environment and a system thereof. A security communication method in the NFV environment according to an exemplary embodiment of the present invention is a security communication method between virtualized network functions (VNF) in a network function virtualization (NFV) environment including: performing authentication between a first VNF and a second VNF by an element manager using a hash chain; generating secret keys based on its own hash
(Continued)

chains by the first VNF and the second VNF which are authenticated; and performing the communication by the first VNF and the second VNF using its own secret keys.

11 Claims, 8 Drawing Sheets

(51) Int. Cl.
*H04L 9/08* (2006.01)
*H04L 9/14* (2006.01)

(56) References Cited

U.S. PATENT DOCUMENTS

| | | | |
|---|---|---|---|
| 2016/0094667 A1* | 3/2016 | Jani | H04L 67/16 709/202 |
| 2016/0337329 A1* | 11/2016 | Sood | H04L 63/205 |
| 2017/0012975 A1* | 1/2017 | Ilyadis | H04L 63/08 |
| 2017/0295409 A1* | 10/2017 | Simon | H04N 21/41407 |
| 2017/0302646 A1 | 10/2017 | Wang et al. | |
| 2018/0288101 A1* | 10/2018 | Sharma | H04L 63/205 |
| 2018/0337931 A1* | 11/2018 | Hermoni | G06F 16/955 |
| 2019/0028350 A1* | 1/2019 | Yeung | H04L 41/0893 |
| 2019/0058709 A1* | 2/2019 | Kempf | H04L 9/3226 |

OTHER PUBLICATIONS

Ranjeet Pawar et al., Vidya Chitre, "MKAuth: Multikey Authentication ForMulticast MANET", Apr. 2015, International Journal of Modern Trends in Engineering and Research, vol. 02, Issue 04, Mumbai.

Vyshnavi Bandaru, "Virtual VPN in the Cloud: Design and Modeling of an IPSec VPN in Virtualized Environment" Sep. 2015, Karlskrona Sweden.

ETSI GS NFV-SEC 013 V3.1.1, "Network Functions Virtualisation (NFV) Release 3; Security; Security Management and Monitoring specification", (Feb. 28, 2017), Section 6.4.2 , 7.6.4.

Razieh Mokhtarnameh et al., "A Comparison Study on Key Exchange—Authentication protocol ", Sep. 2010, International Journal of Computer Applications vol. 7, No. 5, Malaysia.

Hyunjin Kim et al., "Trust Mechanism in NFV using Hash-chain", KSII The 12th Asia Pacific International Conference on Information Science and Technology(APIC-IST) Jun. 25-28, 2017.

* cited by examiner

(1) CPU usage rate in accordance with ICMP packet transmission (2) CPU usage rate in accordance with TCP packet transmission (3) CPU usage rate in accordance with UDP packet transmission

SECURITY COMMUNICATION METHOD IN NFV ENVIRONMENT AND SYSTEM THEREOF

TECHNICAL FIELD

The present invention relates to a security communication method in a NFV environment and a system thereof, and more particularly, to a security communication method in a NFV environment which performs authentication between VNFs in a tenant in a NFV environment and controls a traffic to ensure safe communication between VNFs and a system thereof.

BACKGROUND ART

Recently, world network trends introduce a virtualization technology to more efficiently utilize resources without depending on the hardware. This is because organizations and enterprises take advantages of virtualization technology to efficiently utilize resources and simplify the construction and management of infrastructure, thereby reducing the cost.

A network functional virtualization (NFV) technology is a next-generation network virtualization technology which reflects such demands. The NFV separates various functions in the network equipment to upload and utilize a virtual network function (VNF) which is a virtual system which is controlled and managed by software to an operating system of a server. The NFV uses a method which virtualizes a function of physical network equipment to be executed in a hardware in which a virtual machine server or a general-purpose processor is mounted. When the NFV technology is used, a network may be logically built so that it is possible to flexibly respond to the network changes of the related art.

However, as the number of virtualized equipment is increased, if the manager directly manages setting information of the virtualized VNF, using an element manager (EM) whenever a configuration and a setting of a tenant in the NFV are changed, efforts and necessary expenses such as capital expenditure (CAPEX) and operating expenses (OPEX) are high.

Further, the VNF loaded in the tenant does not undergo a separate authentication process so that a malicious user may load a malicious VNF to contaminate the entire tenants.

Therefore, it is required to develop a technique which automatically manages a VNF setting in accordance with the change of the network, performs authentication between VNFs in a dynamically configured tenant, and controls a traffic between VNFs.

With regard to this, Korean Unexamined Patent Application Publication No. 10-2012-0065347 is disclosed.

DISCLOSURE

Technical Problem

A technical object to be achieved by the present invention is to provide a security communication method and a system thereof which perform authentication between VNFs in a tenant and control a traffic between the VNFs.

Another technical object to be achieved by the present invention is to provide a security communication method and a system thereof which ensure safe communication between VNFs.

Technical problems of the present invention are not limited to the above-mentioned technical problems, and other technical problems, which are not mentioned above, can be clearly understood by those skilled in the art from the following descriptions.

Technical Solution

In order to achieve the above technical object, a security communication method in the NFV environment according to an exemplary embodiment of the present invention is a security communication method between virtualized network functions (VNF) in a network function virtualization (NFV) environment including: performing authentication between a first VNF and a second VNF by an element manager using a hash chain; generating secret keys based on its own hash chains by the first VNF and the second VNF which are authenticated; and performing the communication by the first VNF and the second VNF using its own secret keys.

Desirably, before the performing of authentication, the method may further include generating a hash chain of a VNF image by a virtualized infrastructure manager (VIM) when the VNF in a tenant is instantiated, to share the hash chain with the element manager.

Desirably, the sharing includes: calculating VNF identification information $VNF_{ID}$ in the tenant by combining at least one of tenant identification information, VNF identification information, and instance identification information; calculating a hash chain by applying the calculated VNF identification information $VNF_{ID}$ in the tenant to the hash function and sharing the calculated hash chain with the element manager; and sharing the updated hash chain with the element manager when the calculated hash chain is updated.

Desirably, the sharing of the updated hash chain with the element manager includes: updating the hash chain by applying a hash function to a previous hash chain when the VNF image is modified/changed or periodically; and transmitting the updated hash chain to the element manager.

Desirably, in the transmitting of the updated hash chain to the element manager, the updated hash channel is encrypted with a symmetric encipherment algorithm which uses a previous hash chain as an encryption key to be transmitted to the element manager.

Desirably, the performing of authentication includes: when an initial message is received from the first VNF, requesting and receiving the hash chain from the second VNF; authenticating the second VNF by comparing the received hash chain of the second VNF with a previous stored second VNF hash chain; when the authentication of the second VNF is completed, requesting and receiving the hash chain from the first VNF; authenticating the first VNF by comparing the received hash chain of the first VNF with a previous stored first VNF hash chain; and transmitting an authentication result of the first VNF and the second VNF to the first VNF.

Desirably, when the hash chain of the second VNF is a hash chain obtained by encrypting a hash chain which is currently allocated to the second VNF using a hash chain which is most recently allocated to the second VNF as an encryption key, in the authenticating of the second VNF, the encrypted hash chain of the second VNF is decoded using the most recent hash chain of the second VNF which is previously stored and the second VNF is authenticated by comparing the decoded hash chain with the second VNF hash chain which is previously stored, when the hash chain of the first VNF is a hash chain obtained by encrypting a hash chain which is currently allocated to the first VNF using a hash chain which is most recently allocated to the first VNF as an encryption key, in the authenticating of the first VNF, the encrypted hash chain of the first VNF is decoded using the most recent hash chain of the first VNF which is previously stored and the first VNF is authenticated by comparing the decoded hash chain with the first VNF hash chain which is previously stored.

Desirably, the secret key may be generated using a Diffie-Hellman (D-H) algorithm based on a hash chain.

Desirably, the generating of secret keys includes: receiving a first integer p and a second integer q from element managers by the first VNF and the second VNF, respectively; generating a first public key and a second public key using the received first integer p, second integer q, and its own hash chains, by the first VNF and the second VNF; transmitting the first public key to the second VNF by the first VNF and transmitting the second public key to the first VNF by the second VNF; and generating a first secret key using its own hash chain and the second public key by the first VNF and generating a second secret key using its own hash chain and the first public key by the second VNF, and the hash chain may be a private key.

Desirably, the performing of communication includes: encrypting a message using the first secret key and transmitting the encrypted message to a VNF gateway by the first VNF; obtaining setting information for the message, comparing the obtained setting information with previously stored security policy information by the VNF gateway to transmit the encrypted message to the second VNF when two information coincides with each other; and decoding the encrypted message using the second secret key by the second VNF.

Desirably, when two information does not coincide, the VNF gateway may block the encrypted message.

In order to achieve the above technical object, a security communication system in the NFV environment according to another exemplary embodiment of the present invention is a system for security communication between VNFs in a tenant including a plurality of VNFs in a network function virtualization (NFV) environment, the system including: an element manager which manages hash chains allocated to the plurality of VNFs and authenticates the VNFs using a hash chain of the VNFs which want the communication; and a VNF gateway which is located between the plurality of VNFs in the tenant and sets a Sec-catalog in which security policy information for the VNF traffic is set, to control a traffic between VNFs, in which the VNF which is authenticated in the element manager generates a secret key based on its own hash chain, encrypts a message with the generated secret key to transmit the message to the VNF gateway, and when the encrypted message is received from the VNF gateway, decodes the encrypted message using the secret key, and the VNF gateway obtains the setting information for the message and compares the obtained setting information with the security policy information so that when two information coincides with each other, the VNF gateway transmits the encrypted message to the VNF of the other party.

Desirably, the system may further include a VIM which generates a hash chain of the VNF image when the VNF in the tenant is instantiated, to share the hash chain with the element manager.

Desirably, the VIM updates the hash chain by applying a hash function to a previous hash chain when the VNF image is modified/changed or periodically and shares the updated hash chain with the element manager.

Advantageous Effects

According to the present invention, before VNFs in a tenant perform the communication, authentication between VNFs is performed using a hash chain so that a VNF which is not authenticated is identified and thus the contamination of the tenant is prevented.

Further, according to the present invention, a VFN gateway controls a traffic between VNFs using security policy information of Sec-catalog to solve a malicious traffic propagation problem between VNFs, thereby ensuring a safe NFV environment.

The effects of the present invention are not limited to the technical effects mentioned above, and other effects which are not mentioned can be clearly understood by those skilled in the art from the following description.

BEST MODE

Hereinafter, the most preferred exemplary embodiments of the present invention will be described in detail with reference to the accompanying drawings so that those skilled in the art may easily carry out the technical spirit of the present invention. In the figures, even though the parts are illustrated in different drawings, it should be understood that like reference numbers refer to the same or equivalent parts of the present invention throughout the several figures of the drawing. Furthermore, when it is judged that specific description on known configurations or functions related in the description of the present invention may unnecessarily obscure the essentials of the present invention, the detailed description will be omitted.

Hereinafter, exemplary embodiments according to the present invention will be described in detail with reference to accompanying drawings.

Figure 1:
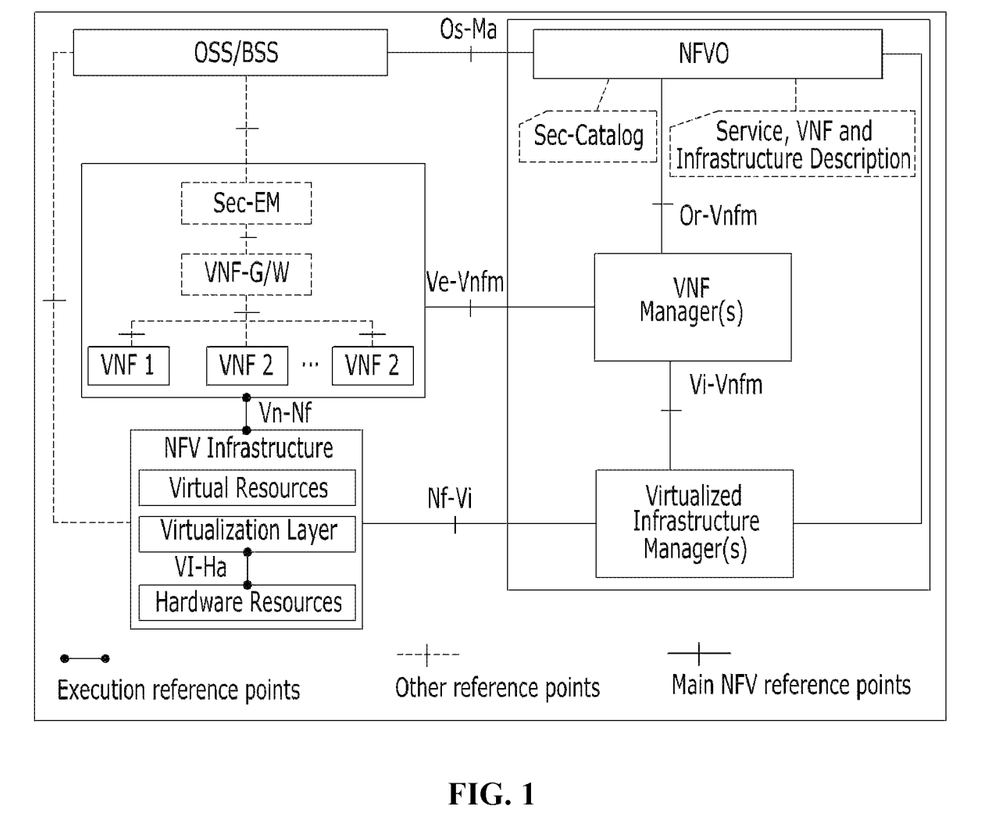
FIG. 1 is a view for explaining a system for security communication in a NFV environment according to an exemplary embodiment of the present invention.
Figure 2:
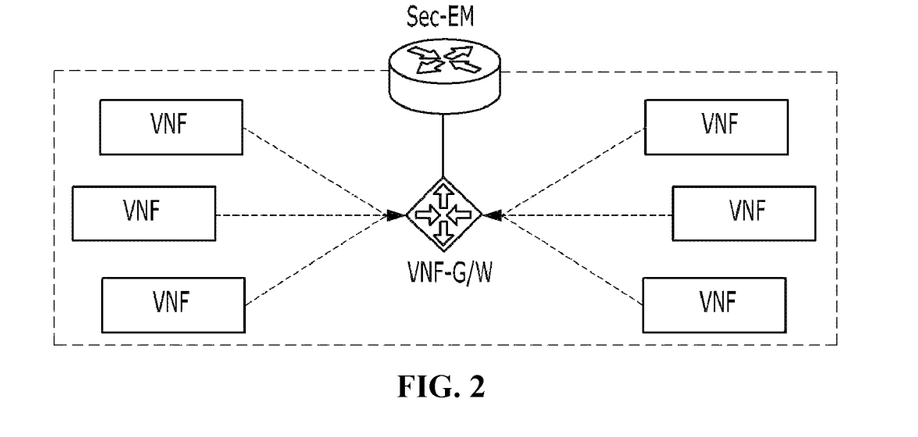
FIG. 2 is a view for explaining a position of a VNF gateway according to an exemplary embodiment of the present invention.

FIG. 1 is a view for explaining a system for security communication in a NFV environment according to an exemplary embodiment of the present invention and FIG. 2 is a view for explaining a position of a VNF gateway according to an exemplary embodiment of the present invention.

Referring to FIG. 1, a system for security communication in a NFV environment according to an exemplary embodiment of the present invention is a system which enables security communication through authentication between VNFs in a tenant and traffic control between VNFs and includes operation service systems (OSS)/business service systems (BSS), sec-EM (element manager), at least one tenant including at least one virtual network function (VNF), a network function virtualization infrastructure (NFVI), and NFV management and orchestration (MANO).

The VNF corresponds to applications which operate in a virtual machine (VIVI) on a server and implements a network function by software. As the VNF, for example, mobility management entity (MME), serving gateway (S-GW), or PDN gateway (P-GW) in an evolved packet core (EPC) which is a core network of a long term evolution (LTE) network may be implemented by the software (virtual machine).

The operation service systems (OSS) are collectively referred to as a system (devices, software, or structures) required for a service provider (carrier) to construct and operate a service. The business service systems (BSS) are a collective term of an information system (devices, software, or structures) used by a service provider (carrier) for charging or billing the fee or customer response.

The Sec-EM manages VNFs included in the tenant.

Specifically, the Sec-EM uses a hash chain of the VNF image to perform authentication between VNFs in the tenant and identify the malicious VNF. That is, the Sec-EM receives and stores the hash chain of the VNFs included in the tenant from a VIM so that authentication of a first VNF and a second VNF is performed using hash chains of the first VNF and the second VNF which want the communication.

As described above, the Sec-EM identifies whether the VNF which performs the communication is a malicious VNF depending on whether the hash chain is stored before performing the VNF communication.

The authenticated VNF generates a secret key based on its own hash chain and encrypts a message using the secret key to perform the communication between VNFs. In this case, the VNF performs the communication through the VNF gateway and the VNF gateway controls the traffic between VNFs using a previously stored security policy information.

The VNF gateway (VNF-G/W) is located between the VNFs in each tenant, as illustrated in FIG. 2, sets a Sec-catalog in which a security policy for the VNF traffic is set to detect and prevent a DDoS attack using a malicious traffic between the VNFs based on a whitelist.

The VNF gateway receives traffic information from the Sec-catalog and controls the traffic transmitted between the VNFs. When the Sec-catalog is reflected to the VNF gateway, security policy information set in the Sec-catalog and other traffics are considered as attacks and a QoS (quality of service) level may be lowered, and a transmission bandwidth traffic may be reduced. Therefore, a traffic control technology using a security policy of a VNF gateway is used to detect an abnormal traffic pattern between VNFs and prevent information leakage accident. For example, when an attacker transmits a large amount of traffics from the first VNF to the second VNF to stop a server which is being executed in the second VNF due to a flooding attack, the VNF gateway controls the traffics to prevent the accident. Further, when important information such as a personal ID or address is stored in a server which uses the VNF, the VNF gateway detects a large amount of traffic flow from the corresponding VNF to the outside and analyzes an abnormal pattern which transmits data at dawn to prevent the information leakage.

A network function virtualization infrastructure (NFVI) which is an executing infrastructure of the VNF is an infrastructure which allows a hardware resource of a physical machine (server) such as a computing, storage, and network function to be flexibly treated as a virtualization hardware resource such as virtualization computing, virtualization storage, and virtualization network which are virtualized by a virtualization layer such as hypervisor.

The NFV-MANO manages the NFVI and performs a function of organizing allocation of resources for the VNF instance. The NFV MANO (management & orchestration) includes a NFV-orchestrator (NFVO), a VNF-manager (VNFM), and a virtualized infrastructure manager (VIM).

The NFV-orchestrator (NFVO) performs orchestration of the NFVI resource and lifecycle management (instantiation, scaling, termination, updating of the NS instance) of a network service (NS). Further, the NFVO manages the VNF catalog and Sec-catalog.

The VNF catalog represents a repository of the VNF package and generates a VNF package such as a VNF descriptor (VNFD), a software image, or a manifest file and supports the management thereof. In the Sec-catalog, information such as a protocol of an instantiated (or registered) VNF, a port number, ingress policing rate, and ingress policing burst is stored.

The NFVO registers the VNFD in the VNF catalog during the VNF instantiating process and registers the Sec-catalog when the VNFD is registered in the VNF catalog. In this case, setting information of the registered VNF catalog and sec-catalog is applied to the VNF gateway.

The VNF-manager (VNFM) performs lifecycle management (instantiation, updating, searching, scaling, termination, (assisted/auto) healing) of the VNF and event notification.

The virtualized infrastructure manager (VIM) controls the NFVI (such as computing, storage, resource management of the network, failure monitoring of the NFVI which is an executing infrastructure of the NFV, and monitoring of resource information) through the virtualization layer.

When each VNF in the tenant is instantiated, the VIM generates a hash chain of a VNF image. Further, the VIM periodically updates the hash chain of the VNF or updates the hash chain when the corresponding VNF is modified or changed. In this case, the VIM may update the hash chain by applying a hash function to a hash chain which is previously (most recently) generated. The VIM shares the generated or updated hash chain of the VNF with the sec-EM.

A reference point Os-Ma is a reference point between an operation service systems (OSS)/business service systems (BSS) and the NFVO and is used for a request of lifecycle management of the network service, a request of VNF lifecycle management, transmission of NFV-related status information, or exchange of policy management information.

A reference point Vi-VnFm is used for a request of resource allocation from the VNFM, configuration of a virtualization resource, and exchange of status information.

A reference point Ve-Vnfm is used for VNF instantiation between the EM and the VNFM, search, updating, termination, scale out/in, and scale up/down of VNF instance, configuration of the VNFM from the EM, transmission of an event, configuration of the VNF from the VNFM, and notification of an event.

A reference point Nf-Vi is used for allocation a virtualization resource for a resource allocation request such as allocation of the VM, updating of VIVI resource allocation, VIVI migration, VIVI termination, generation and removal of connection between VMs together with an instruction of computing, storage, network resource management, transmission status information of the virtualization resource, configuration of the hardware resource, and exchange of status information.

A reference point Or-Vnfm is used for resource-related request (authentication, reservation, or allocation) by a VNF-manager (VNFM), transmission of configuration information to the VNFM, and collection of status information of the VNF.

Hereinafter, a process of registering the VNF in the system configured as described above will be described.

The NFVO validates the request by checking the sender authentication and/or instantiation parameter and checks the feasibility. When the request is successfully validated, the NFVO calls the VNFM to instantiate the VNF. The VNFM validates the request and processes the instantiation parameter. Next, the VNFM transmits a request for resource allocation to the NFVO. The NFVO executes pre-allocation of an arbitrarily requested resource and then transmits the request to the VIM for the resource allocation. For example, when a processor usage amount counter exceeds a predetermined threshold, the VIM allocates more computing and storing resources.

In response to the request for the resource allocation, the VIM allocates the requested computing, storing, and/or networking resources and transmits acknowledgement to the NFVO. In order to instruct the completion of the resource allocation, the NFVO transmits the acknowledgement to the VNFM. Next, the VNFM instantiates the VNF and configures a VNF having an arbitrary VNF-specified lifecycle parameter. The VNFM notifies a new VNF to the Sec-EM. Next, the Sec-EM configures a VNF having information requested for the corresponding VM operation. The VNFM reports that the new VNF instance is successfully added to the NFV. The NFVO updates the VNF catalog and the Sec-catalog by a new instance descriptor. The Sec-EM notifies a new VNF to the OSS/BSS. The OSS/BSS acknowledges the successful instantiation of the new VNF.

In the meantime, when each VNF in the tenant is instantiated, the VIM generates a hash chain of the VNF image and shares the generated hash chain with the Sec-EM or the corresponding VFM.

When the registered VNF wants to communicate with other VNFs in the tenant as described above, the present invention performs the authentication between the VNFs and enables the security communication.

Hereinafter, the security communication method between VNFs will be described under the assumption that the first VNF in the tenant wants to communicate with the second VNF.

Figure 3:
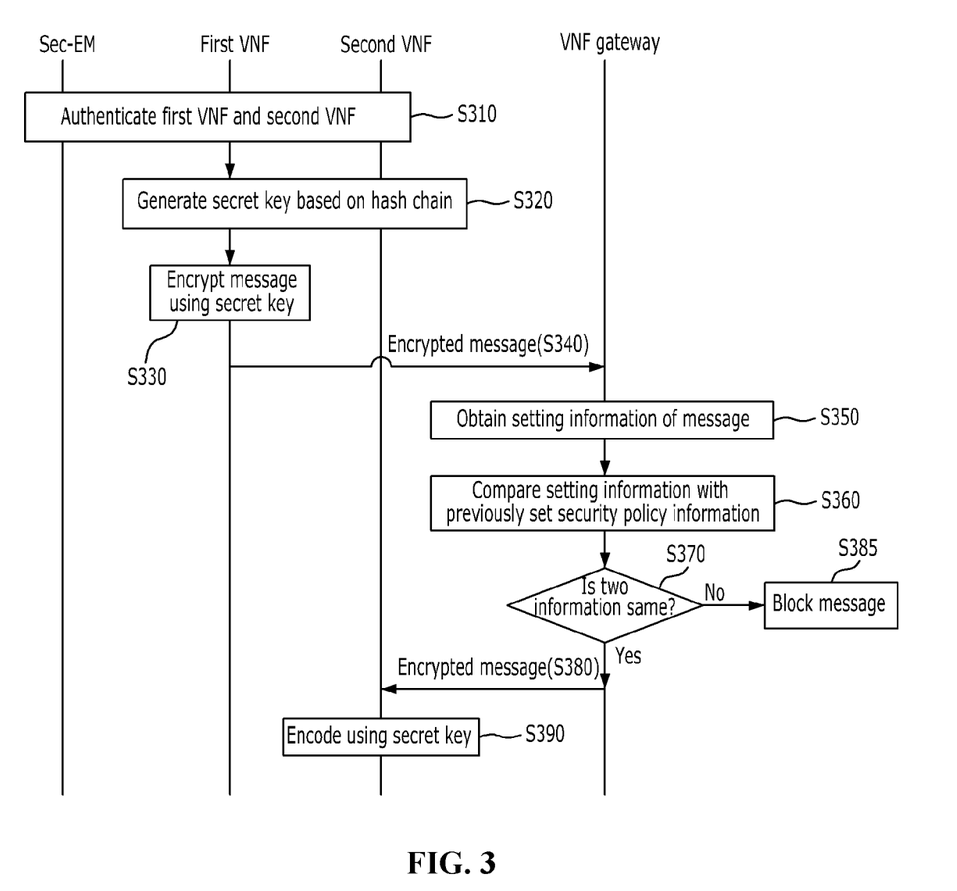
FIG. 3 is a view for explaining a security communication method in a NFV environment according to an exemplary embodiment of the present invention.

FIG. 3 is a view for explaining a security communication method in a NFV environment according to an exemplary embodiment of the present invention.

Referring to FIG. 3, the first VNF performs the authentication between the first VNF and the second VNF through the Sec-EM before communicating with the second VNF in step S310. That is, when each VNF in the tenant is instantiated, the VIM generates the hash chain of the VNF image and shares the hash chain with the Sec-EM. By doing this, the Sec-EM receives and stores the hash chain of the VNFs included in the tenant from the VIM so that authentication between the first VNF and the second VNF is performed using hash chains of the first VNF and the second VNF which want the communication to identify the malicious VNF.

A method of generating a hash chain by the VIM to share the hash chain with the Sec-EM will be described in more detail with reference to FIG. 4 and an authentication method between the first VNF and the second VNF by the Sec-EM will be described in detail with reference to FIG. 5.

When the step S310 is performed, the first VNF generates a secret key based on its own hash chain in step S320, encrypts the message using the secret key in step S330, and transmits the encrypted message to the VNF gateway in step S340. In this case, the first VNF generates a secret key based on the hash chain using the secret key encryption algorithm and the secret key encryption algorithm may be the Diffie-Hellman algorithm. The Diffie-Hellman algorithm is an algorithm which allows two VNFs to exchange a common key in a public communication network environment without exchanging a secret in advance and generates a secret key using a public key and a private key. The public key is a key disclosed to the outside and the private key is a key which is owned by an individual and is not known to the outside. The private key may be its own hash chain. The secret key is a key used for actual encryption and two VNFs uses the same secret key to encrypt specific data and transmit/receive the data.

When the first VNF generates a secret key, the second VNF also generates a secret key based on its own hash chain. A method of generating a secret key based on a hash chain by the VNF will be described in more detail with reference to FIG. 6.

When the step S340 is performed, the VNF gateway obtains setting information of the encrypted message in step S350 and compares the obtained setting information with previously stored security policy information in step S360, to determine whether two information is the same in step S370. In this case, the VNF gateway receives the security policy information from the Sec-catalog in which the security policy for the first VNF is set and compares the security policy information with the setting information of the message.

As a result of the determination in step S370, when two information coincides with each other, the VNF gateway transmits the encrypted message to the second VNF in step S380. By doing this, the second VNF decodes the encrypted message using a secret key which is generated together at the time when the first VNF generates the secret key in step S390.

As a result of the determination in step S370, if two information does not coincide, the VNF gateway blocks the encrypted message in step S385. As described above, the VNF gateway permits traffics in which two setting information coincides with each other, but controls the traffic in which two setting information does not coincide. A method of controlling the traffic in accordance with security policy information by the VNF gateway will be described with reference to FIG. 7.

By means of the above-described processes, the VNF which is not authenticated is identified and a malicious traffic propagation problem between VNFs is solved so that a safe NFV environment may be ensured.

Figure 4:
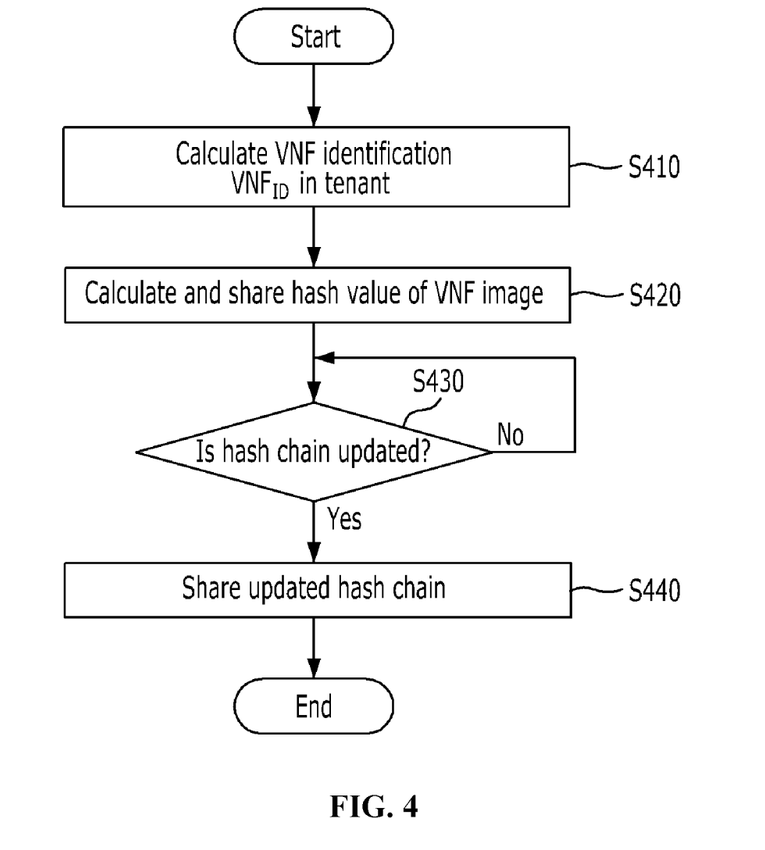
FIG. 4 is a view illustrating a method of generating and sharing a hash chain by a VIM according to an exemplary embodiment of the present invention.

FIG. 4 is a view illustrating a method of generating and sharing a hash chain by a VIM according to an exemplary embodiment of the present invention.

Referring to FIG. 4, the VIM calculates VNF identification information $VNF_{ID}$ in the tenant to identify the VNF in step S410. In this case, the VIM combines tenant identification information Tenant_ID including the corresponding VNF, VNF identification information VNF ID, and instance identification information Instance_ID to calculate VNF identification information $VNF_{ID}$ in the tenant.

Thereafter, the VIM calculates a hash value of the VNF image using the VNF identification information $VNF_{ID}$ in the tenant in step S420. That is, the VIM applies the VNF identification information $VNF_{ID}$ in the tenant to the hash function to calculate a hash value of the VNF image. The hash value is updated using an immediately previous (the most recent) hash value so that the hash value may have the same meaning as the hash chain.

Since the hash function maps data having an arbitrary length to data having a fixed length and is not one function, the operation may not be returned. Therefore, even a person who knows the hash value cannot find the input of the hash function. Further, even though the hash value is the same, the same input value cannot be guaranteed. Even though just one bit of an original input is changed, the hash value may be significantly changed by the hash function. There are various hash functions such as MD5, CRC32, and SHA-type.

The hash chain is a method of calculating a hash value by continuously using "seed" which is an arbitrary value set by a client. That is, in order to generate a hash chain having a length n, x (seed) is used as an input of the hash function h(x). This process is repeatedly used to calculate a root value $h^{n+1}(x)$. Therefore, when a program which generates a password by the hash chain transmits the hash chain to the server, even though the attacker knows $h^n(x)$ by eavesdropping the transmission process, the attacker cannot calculate $h^{n-1}(x)$. When the security characteristic of the hash is used, a hash chain of one-time password is generated during a client-server authentication process.

After performing step S420, when the hash chain is updated in step S430, the VIM shares the updated hash chain with the Sec-EM in step S440. When the VNF image is modified/changed, the VIM updates the hash chain. That is, when the VIVI is stopped/discontinued after generating a hash value Hash($VNF_{ID}$) using the $VNF_{ID}$ at the beginning, the VIM needs to register the VNF image again. Therefore, when the VNF image is registered again, it means that the VNF image is modified/changed. Therefore, when the VNF image is modified/changed, the VIM applies the hash function to the previous (most recent) hash chain Hash($VNF_{ID}$) as represented in the following Equation 1 to update the hash chain.

$$\text{Hash}^2(VNF_{ID}) = \text{Hash}(\text{Hash}(VNF_{ID})) \qquad \text{[Equation 1]}$$

As described above, the VIM may update the hash chain by applying the hash chain which is previously calculated to the hash function. This may be represented by the following Equation 2.

$$\text{Hash}^n(VNF_{ID}) = \text{Hash}(\text{Hash}^{n-1}(VNF_{ID})) \qquad \text{[Equation 2]}$$

Here, n may be an integer which is larger than 0. As seen from Equation 2, in order to generate an n-th hash chain, an n−1-th hash chain is necessary.

As described above, the VIM generates the hash chain of the VNF image and the VIM and the Sec-EM share the hash value of the VNF after registering (on-boarding) and instantiating the VNF image.

Further, when the VNF is being executed, the hash value of the VNF image is changed. Therefore, as represented by the following Equation 3, the VIM periodically updates the hash chain of the VNF.

$$E_{Hash^{n-1}(VNF)}\{\text{Hash}^n(VNF_{ID})\} \qquad \text{[Equation 3]}$$

The hash chain which is updated to be shared by the Sec-EM is shared using a symmetric encipherment algorithm which uses the previous hash chain as an encryption key. The symmetric encipherment algorithm is an encipherment algorithm which uses the same key for the encipherment and decipherment. Therefore, when the secret key (previous hash chain) is not known, it is computationally infeasible to decode the encrypted data.

Further, the VNF image shares the hash chain updated from the VIM through the VNFM.

As described above, when the VNF image is modified or changed or periodically, the VIM updates the hash channel of the VNF and uses the symmetric encipherment algorithm which uses a previous hash chain as an encryption key to share the updated hash channel with the Sec-EM. As described above, the hash chain is shared using the symmetric encipherment algorithm so that when the previous hash chain is not known, the updated hash chain cannot be decoded.

Figure 5:
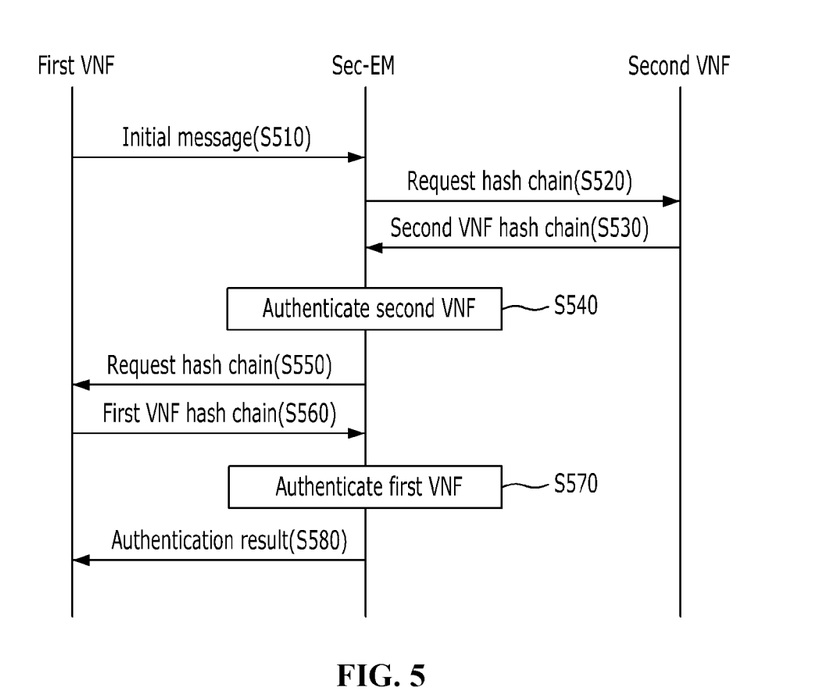
FIG. 5 is a view illustrating an authentication method between VNFs according to an exemplary embodiment of the present invention.

FIG. 5 is a view illustrating an authentication method between VNFs according to an exemplary embodiment of the present invention.

Referring to FIG. 5, when the first VNF wants to communicate with the second VNF, the first VNF transmits an initial message (Initi) to the Sec-EM. That is, in order to determine whether the first VNF and the second VNF are malicious VNFs before performing the communication, the first VNF transmits the initial message to the Sec-EM. In this case, the initial message may include the ID $ID_{VNF1}$, identification information $ID_{VNF2}$ of the second VNF, and a challenge value CH required for the authentication.

When the step S510 is performed, the Sec-EM transmits a second VNF hash chain request message to the second VNF in step S520 and the second VNF transmits the second VNF hash chain to the Sec-EM. Here, the second VNF hash chain request message includes second VNF identification information $ID_{VNF2}$, challenge CH, and the like. Since the second VNF stores the updated hash chain, the second VNF may transmit its own hash chain $E_{Hash_{m-1}}\{\text{Hash}^n(VNF_2)\}$ to the Sec-EM. In this case, $E_{Hash_{m-1}}\{\text{Hash}_n(VNF_2)\}$ may be a hash chain which is most recently updated to be shared from the VIM.

When the step S530 is performed, the Sec-EM compares the hash chain of the second VNF with a previous stored second VNF hash chain to authenticate the second VNF in step S540. That is, when the received hash chain of the second VNF is the same as the second VNF hash chain which is previously stored, the Sec-EM identifies the VNF as an authenticated VNF and when the hash chain is not the same as the second VNF hash chain, the Sec-EM may identify the VNF as a malicious VNF. The n-th hash chain of the second VNF is encrypted by the n−1-th hash chain, so that if the hash chain is not periodically updated, the n-th hash chain cannot be decoded.

When the authentication of the second VNF is completed, the Sec-EM transmits a first VNF hash chain request message to the first VNF in step S550 and the first VNF transmits the first VNF hash chain to the Sec-EM in step s560. Here, the first VNF hash chain request message includes first VNF identification information $ID_{VNF1}$ and challenge CH. Since the first VNF stores the updated hash chain, the first VNF may transmit its own hash chain $E_{Hashn-1}\{Hash^n(VNF_1)\}$ to the Sec-EM. In this case, $E_{Hashn-1}\{Hash_n(VNF_1)\}$ may be a hash chain which is most recently updated to be shared from the VIM.

When the step S560 is performed, the Sec-EM compares the hash chain of the first VNF with a previous stored first VNF hash chain to authenticate the first VNF in step S570. That is, when the received hash chain of the first VNF is the same as the first VNF hash chain which is previously stored, the Sec-EM identifies the VNF as an authenticated VNF and when the hash chain is not the same as the first VNF hash chain, the Sec-EM may identify the VNF as a malicious VNF. The n-th hash chain of the first VNF is encrypted by the n−1-th hash chain, so that if the hash chain is not periodically updated, the n-th hash chain cannot be decoded.

When the step S570 is performed, the Sec-EM transmits the authentication result to the first VNF in step S580. Here, the authentication result may include whether the first VNF is malicious or whether the second VNF is malicious. Therefore, when both the first VNF and the second VNF are authenticated VNFs, the first VNF performs the communication with the second VNF. Further, if any one of the first VNF and the second VNF is identified as a malicious VNF, the communication with the second VNF cannot be performed.

In the meantime, the first VNF and the second VNF may encrypt the current hash chain using the previous hash chain as an encryption key to transmit the hash chain to the Sec-EM and the Sec-EM may decode the encrypted hash chain using the previous hash chain. Therefore, when the hash chain is not periodically updated, the current hash chain cannot be decoded.

By the above-described process, the authentication may be performed not only between the Sec-EM and the VNF but also between VNFs.

Figure 6:
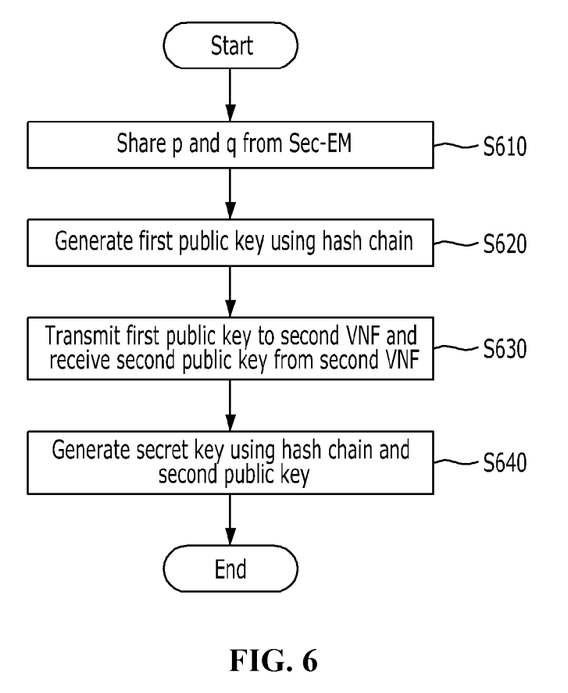
FIG. 6 is a view for explaining a secret key generating method according to an exemplary embodiment of the present invention.

FIG. 6 is a view for explaining a secret key generating method according to an exemplary embodiment of the present invention. Here, the generation of the secret key using a Diffie-Hellman (D-H) algorithm will be described.

Referring to FIG. 6, the first and second VNFs receive arbitrary first integer p and a second integer q from the Sec-EM, respectively, in step S610. Here, p is a prime number used for the D-H operation and may be an integer which is larger than 300 and q is a specific number indicating a default value used for the D-H operation and may be an integer between 1 and (p−1).

When the step S610 is performed, the first and second VNFs generate public keys using its own hash chains, respectively, in step S620. In the Diffie-Hellman algorithm, the public key is generated using p, q, and a private key and the private key of the VNF may be a hash chain. That is, the private key of the first VNF may be its own hash chain and the private key of the second VNF may be its own hash chain. The hash chains of the first and second VNFs may be integers which are larger than 100 digits.

Therefore, the first VNF generates a first public key $R_i$ using p, q, and its own hash chain and the second VNF generates a second public key $R_j$ using p, q, and its own hash chain. Here, i and j are numbers for identifying the VNF. However, in the following description, for the convenience of description, i is referred to as a first VNF and j is referred to as a second VNF.

The first VNF generates the first public key $R_i$ using the following Equation 4 and the second VNF generates the second public key $R_j$ using the following Equation 5.

$$R_i = q^{Hash^a(VNF_i)} \bmod p \quad \text{[Equation 4]}$$

Here, $Hash^n(VNF_i)$ refers to a hash chain of the first VNF.

$$R_j = q^{Hash^a(VNF_j)} \bmod p \quad \text{[Equation 5]}$$

Here, $Hash^n(VNF_j)$ refers to a hash chain of the second VNF.

When the step S620 is performed, the first and second VNFs share its own public keys, respectively, in step S630. That is, the first VNF transmits the first public key to the second VNF and the second VNF transmits the second public key to the first VNF.

When the step S630 is performed, the first and second VNFs generate secret keys using the received public keys of the other parties and its own hash chains (private keys), respectively, in step S640. That is, the first VNF generates a first secret key using the second public key transmitted from the second VNF and its own hash chain and the second VNF generates a second secret key using the first public key transmitted from the first VNF and its own hash chain.

The first VNF generates the first secret key $K_{VNFij}$ using the following Equation 6 and the second VNF generates the second secret key $K_{VNFij}$ using the following Equation 7.

$$K_{VNFij} = R_i^{Hash^n(VNF_j)} \bmod p = \{q^{HashN(VNF_i)}\}^{Hash^a(VNF_j)} \bmod p \quad \text{[Equation 6]}$$

$$K_{VNFij} = R_j^{Hash^n(VNF_i)} \bmod p = \{q^{HashN(VNF_j)}\}^{Hash^a(VNF_i)} \bmod p \quad \text{[Equation 7]}$$

It is understood that Equation 6 and Equation 7 are identical. By doing this, it is understood that the first secret key is the same as the second secret key. Therefore, when the first VNF encrypts the message using the first secret key to transmit the message to the second VNF, the second VNF may decode the encrypted message using the second secret key.

In the meantime, since p is sufficiently large, when the attacker tries to find a key for decoding the encrypted message, the attacker cannot find the secret key through the first public key $q^{Hash^n(VNF_i)}$ or the second public key $q^{Hash^n(VNF_j)}$. Therefore, the first VNF and the second VNF may guarantee the security communication using the secret key $K_{VNF\_ij}$. As a result, since secret keys which are generated by the first VNF and the second VNF using the D-H algorithm are the same, the secret keys may be used for encryption.

Figure 7:
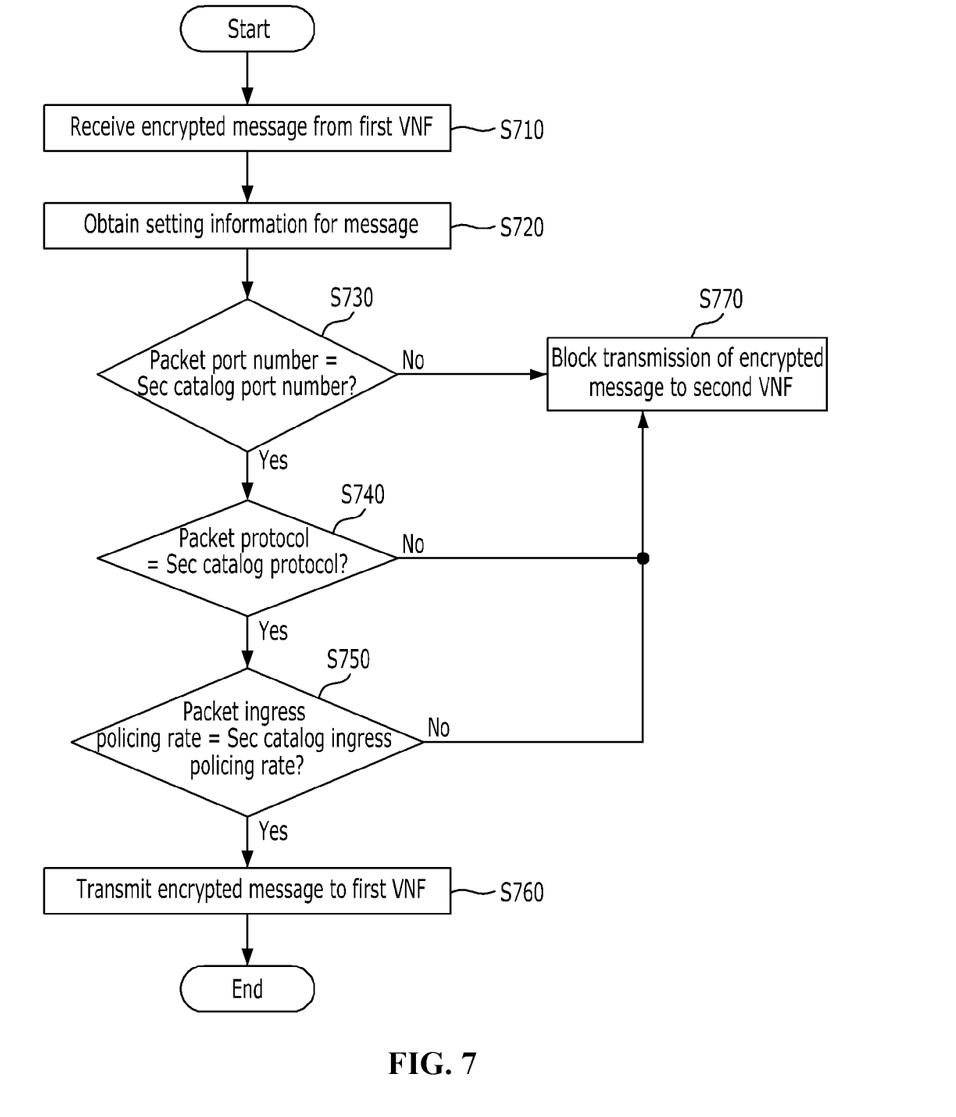
FIG. 7 is a view for explaining a traffic control method of a VNF gateway according to an exemplary embodiment of the present invention.

FIG. 7 is a view for explaining a traffic control method of a VNF gateway according to an exemplary embodiment of the present invention.

Referring to FIG. 7, when the encrypted message is received from the first VNF in step S710, the VNF gateway obtains setting information for the message in step S720. In this case, the VNF gateway obtains setting information which corresponds to previously set security policy information. The security policy information is information set to the Sec-catalog and may include a protocol, a port number, and an ingress policing rate.

When the step S720 is performed, the VNF gateway determines whether the obtained port number is the same as the port number in the Sec-catalog.

As the result of determination in step S730, if the port numbers are the same, the VNF gateway determines whether the obtained protocol is the same as the protocol in the Sec-catalog in step S740.

As the result of determination in step S740, if the protocols are the same, the VNF gateway determines whether the obtained Ingress policing rate is the same as the Ingress policing rate in the Sec-catalog in step S750.

As the result of determination in step S750, if two Ingress policing rates are the same, the VNF gateway transmits the encrypted message to the second VNF in step S760.

As the result of determination in step S730, if two Ingress policing rates are not the same, the VNF gateway does not transmit the encrypted message to the second VNF in step S770.

That is, when the port numbers are not the same, the VNF gateway determines that the message is a malicious traffic to control the message.

As the result of determination in step S740, if protocols are not the same, the VNF gateway does not transmit the encrypted message to the second VNF in step S770. That is, when the protocols are not the same, the VNF gateway determines that the message is a malicious traffic to control the message.

As the result of determination in step S750, if two Ingress policing rates are not the same, the VNF gateway does not transmit the encrypted message to the second VNF in step S770. That is, when two Ingress policing rates are not the same, the VNF gateway determines that the message is a malicious traffic to control the message.

As described above, the VNF gateway receives the security policy information from the Sec-catalog and controls the traffics transmitted between the VNFs. When the Sec-catalog is reflected to the VNF gateway, a traffic which is different from the security policy information set in the Sec-catalog may be considered as an attack and a level of quality of service (QoS) may be lowered, and a transmission bandwidth traffic may be reduced. Therefore, a traffic control technology using a security policy of a VNF gateway is used to detect an abnormal traffic pattern between VNFs and prevent information leakage accident. For example, when an attacker transmits a large amount of traffics from the first VNF to the second VNF to stop a server which is being executed in the second VNF due to a flooding attack, the VNF gateway controls the traffics to prevent the accident. Further, when important information such as a personal ID and address is stored in a server which uses the VNF, the VNF gateway detects a large amount of traffic flow from the corresponding VNF to the outside and analyzes an abnormal pattern of a user which transmits data at dawn to prevent the information leakage.

Hereinafter, a system performance according to the present invention will be described using an experiment result. In order to evaluate the performance of the system (hereinafter, referred to as ASMN) of the present invention, a VNF gateway, a VNF client, and a VNF server are configured in one tenant.

Figure 8:
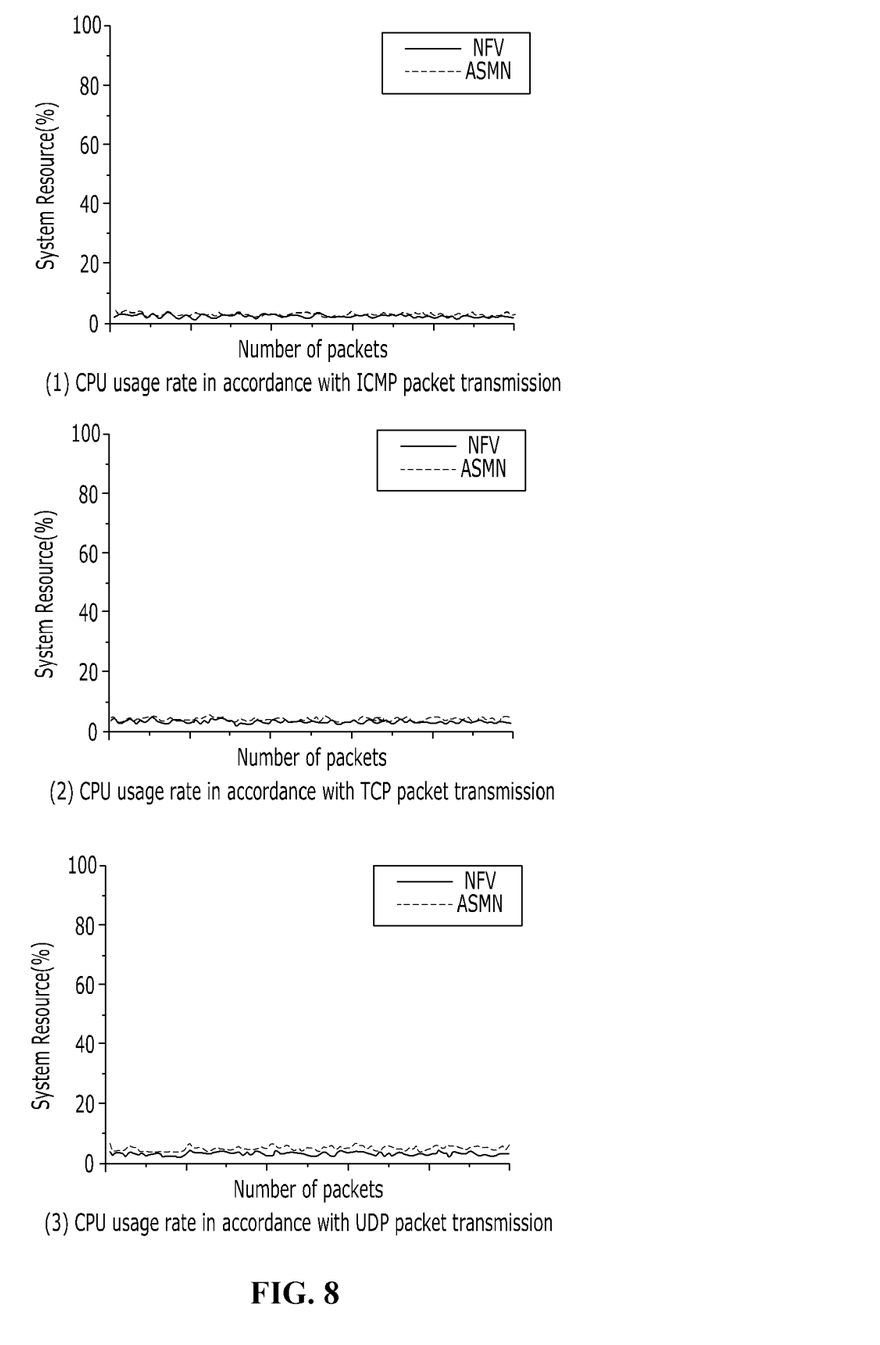
FIG. 8 is a graph for comparing a CPU usage rate in accordance with packet transmission according to an exemplary embodiment of the present invention.

FIG. 8 is a graph for comparing a CPU usage rate in accordance with packet transmission according to an exemplary embodiment of the present invention. FIG. 8 checks a CPU usage rate by transmitting a packet for 25 seconds in ICMP, TCP, and UDP protocols. Referring to FIG. 8, it is confirmed that in the case of ICMP, TCP, and UDP, a total CPU usage rate of the ASMN has increased by less than 1% from the CPU usage rate in a normal NFV environment. Therefore, it is confirmed that the performance is not degraded within microseconds in the communication from the VNF to the VNF.

Figure 9:
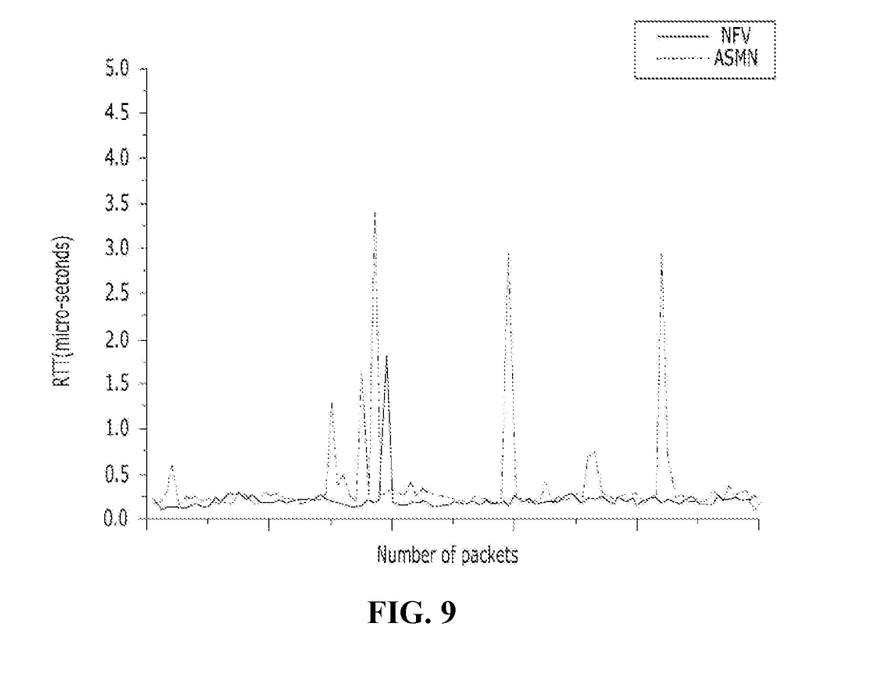
FIG. 9 is a graph for comparing a packet transmission rate between VNFs according to an exemplary embodiment of the present invention.

FIG. 9 is a graph for comparing a packet transmission rate between VNFs according to an exemplary embodiment of the present invention.

Test data is represented in Table 1.

TABLE 1

| ASMN Traffic Input Rate | | |
| --- | --- | --- |
| ICMP traffic | TCP traffic | UCP traffic |
| 64 byte | 64 byte | 64 byte |
| 4096 byte | 4096 byte | 4096 byte |

A client generates arbitrary packets of 64 bytes and 4096 bytes for the ICMP protocol and transmits the packet to the server to measure an RTT (round-trip time) between VNFs of the same tenant which uses the ASMN.

Referring to FIG. 9, it is confirmed that the increased RTT is smaller than 5 m/s. By doing this, it is confirmed that the system of the present invention provides the service without causing the degradation of the performance.

Figure 10:
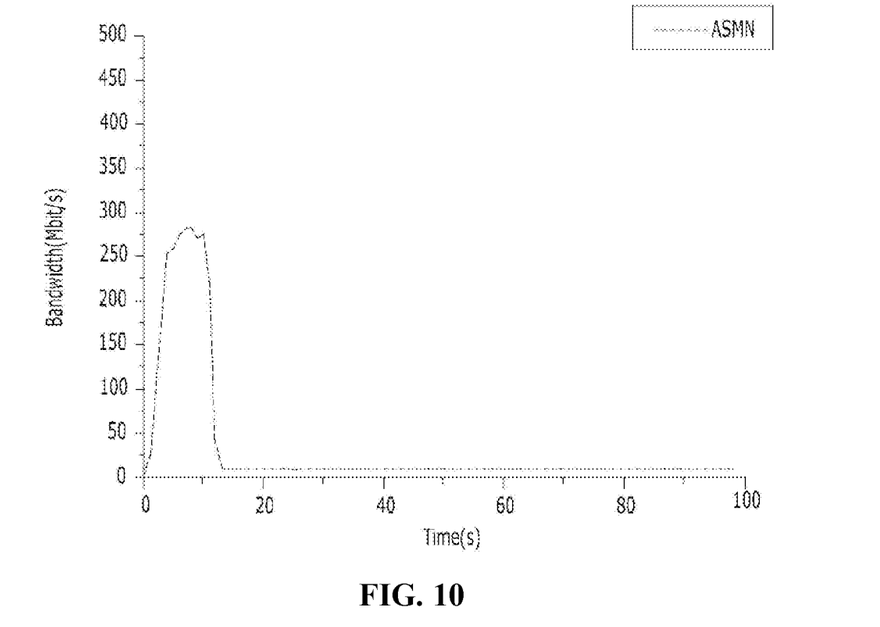
FIG. 10 is a graph illustrating a shaping test result of a VNF gateway for TCP packet flooding according to an exemplary embodiment of the present invention.

FIG. 10 is a graph illustrating a shaping test result of a VNF gateway for TCP packet flooding according to an exemplary embodiment of the present invention.

The ASMN includes a defense mechanism for the malicious traffic of the VNF. A normal malicious attack using a traffic of the VNF is a flooding attack. Data of the defense test is represented in the following Table 2.

TABLE 2

| ASMN Traffic Input Rate |
| --- |
| TCP SYN traffic |
| 5 Mbyte |

A TCP SYN flooding attack for the VNF server is tried for 100 seconds. Thereafter, a Sec-catalog including a traffic shaping rule of 10 Mbit/s is applied to the VNF gateway after 11 seconds from the attack.

In FIG. 10, a traffic of 280 Mbit/s is transmitted to the VNF server. After applying the Sec-catalog, it is understood that the traffic is limited to 9.76 Mbit/s within one second after applying the rule. That is, it is confirmed that the flooding attack is prevented by controlling the incoming traffics.

Although the exemplary embodiment of the present invention has been described above, the present invention is modified in various forms. It is further understood that those skilled in the art may carry out various variations and modification without departing from the claims of the present invention.

The invention claimed is:

1. A security communication method between virtualized network functions (VNF) in a network function virtualization (NFV) environment, the security communication method comprising:
generating a hash chain of a VNF image by a virtualized infrastructure manager (VIM) when a VNF in a tenant is instantiated to share the hash chain with an element manager;
performing authentication between a first VNF and a second VNF by the element manager using the hash chain;
generating a first secret key by the authenticated first VNF based on the hash chain and generating a second secret key by the authenticated second VNF based on a second hash chain; and performing communication by the first VNF and the second VNF using the first secret key and the second secret key, wherein the sharing includes:

calculating VNF identification information $VNF_{ID}$ in the tenant by combining at least one of tenant identification information, VNF identification information, and instance identification information;

calculating the hash chain by applying the calculated VNF identification information $VNF_{ID}$ in the tenant to a hash function and sharing the calculated hash chain with the element manager; and when the calculated hash chain is updated, sharing the updated hash chain with the element manager.

2. The security communication method in a NFV environment of claim 1, wherein the sharing of the updated hash chain with the element manager includes:

updating the hash chain by applying the hash function to a previous hash chain when the corresponding VNF image is modified periodically; and transmitting the updated hash chain to the element manager.

3. The security communication method in a NFV environment of claim 2, wherein in the transmitting of the updated hash chain to the element manager, an updated hash channel is encrypted with a symmetric encipherment algorithm which uses the previous hash chain as an encryption key to be transmitted to the element manager.

4. The security communication method in a NFV environment of claim 1, wherein the performing of authentication includes:

when an initial message is received from the first VNF, requesting and receiving the second hash chain from the second VNF;

authenticating the second VNF by comparing the received hash chain of the second VNF with a previous stored second VNF hash chain;

when the authentication of the second VNF is completed, requesting and receiving the hash chain from the first VNF;

authenticating the first VNF by comparing the received hash chain of the first VNF with a previous stored first VNF hash chain; and transmitting an authentication result of the first VNF and the second VNF to the first VNF.

5. The security communication method in a NFV environment of claim 4, wherein when the second hash chain of the second VNF is a hash chain obtained by encrypting a hash chain which is currently allocated to the second VNF using a hash chain which is most recently allocated to the second VNF as the encryption key, in the authenticating of the second VNF, the encrypted hash chain of the second VNF is decoded using the most recent hash chain of the second VNF which is previously stored and the second VNF is authenticated by comparing the decoded hash chain with the second VNF hash chain which is previously stored, and when the hash chain of the first VNF is a hash chain obtained by encrypting a hash chain which is currently allocated to the first VNF using a hash chain which is most recently allocated to the first VNF as the encryption key, in the authenticating of the first VNF, the encrypted hash chain of the first VNF is decoded using the most recent hash chain of the first VNF which is previously stored and the first VNF is authenticated by comparing the decoded hash chain with the first VNF hash chain which is previously stored.

6. The security communication method in a NFV environment of claim 1, wherein the first and second secret keys are generated using a Diffie-Hellman (D-H) algorithm based on the hash chain.

7. The security communication method in a NFV environment of claim 6, wherein the generating of the first and second secret keys includes:

receiving a first integer p and a second integer q from the element manager by the first VNF and the second VNF, respectively;

generating a first public key and a second public key using the received first integer p, second integer q, and the hash chain and the second hash chain, by the first VNF and the second VNF;

transmitting the first public key to the second VNF by the first VNF and transmitting the second public key to the first VNF by the second VNF; and generating theft first secret key using the hash chain and the second public key by the first VNF and generating the second secret key using the second hash chain and the first public key by the second VNF, wherein the hash chain is a private key.

8. The security communication method in a NFV environment of claim 7, wherein the performing the communication includes:

encrypting a message using the first secret key and transmitting the encrypted message to a VNF gateway by the first VNF;

obtaining setting information for the message, comparing the obtained setting information with a previously stored security policy information by the VNF gateway to transmit the encrypted message to the second VNF when the obtained setting information and the previously stored security policy information coincides with each other; and decoding the encrypted message using the second secret key by the second VNF.

9. The security communication method in a NFV environment of claim 8, wherein when the obtained setting information and the previously stored security policy information does not coincide, the VNF gateway blocks the encrypted message.

10. A system for security communication between VNFs in a tenant including a plurality of VNFs in a network function virtualization (NFV) environment, the system comprising:

an element manager which manages hash chains allocated to the plurality of VNFs and authenticates the VNFs using a hash chain of the VNFs which want communication;

a hardware VNF gateway which is located between the plurality of VNFs in the tenant and sets a Sec-catalog in which security policy information for a VNF traffic is set to control the traffic between the VNFs; and a virtualized infrastructure manager (VIM) which generates a hash chain of a VNF image when a VNF in the tenant is instantiated to share the hash chain with the element manager, wherein the VIM: calculates VNF identification information $VNF_{ID}$ in the tenant by combining at least one of tenant identification information, VNF identification information, and instance identification information; calculates the hash chain by applying the calculated VNF identification information $VNF_{ID}$ in the tenant to a hash function and sharing the calculated hash chain with the element manager; and when the calculated hash chain is updated, shares the updated hash chain with the element manager, and wherein the VNF which is authenticated in the element manager generates a secret key based on the hash chain, encrypts a message with the generated secret key to transmit the message to the VNF gateway, and when the encrypted message is received from the VNF gateway, decodes the encrypted message using the secret key, and the VNF gateway obtains setting information for the message and compares the obtained setting information with the security policy information so that when the obtained setting information and the security policy information coincides with each other, the VNF gateway transmits the encrypted message to the VNF of the other party.

11. The security communication system in a NFV environment of claim 10, wherein the VIM updates the hash chain by applying the hash function to a previous hash chain when the VNF image is modified periodically and shares the updated hash chain with the element manager.

* * * * *